(12) United States Patent
Kahn et al.

(10) Patent No.: US 11,864,214 B2
(45) Date of Patent: Jan. 2, 2024

(54) MULTIPLE PARTY WI-FI ROUTER IN A WIRELESS NETWORK

(71) Applicant: ARRIS Enterprises LLC, Suwanee, GA (US)

(72) Inventors: Michael Kahn, Cherry Hill, NJ (US); John D. Ogden, Media, PA (US); Linh Nguyen, Broomall, PA (US); Dave Scott Swingle, Moorestown, NJ (US); Alpha Kamara, Secane, PA (US); Michael Agnew, Philadelphia, PA (US); Ramesh Manikandan Kumarasamy, Upper Chichester, PA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 111 days.

(21) Appl. No.: 17/476,628

(22) Filed: Sep. 16, 2021

(65) Prior Publication Data

US 2022/0132510 A1    Apr. 28, 2022

Related U.S. Application Data

(60) Provisional application No. 63/106,528, filed on Oct. 28, 2020.

(51) Int. Cl.
| | |
|---|---|
| *H04W 72/53* | (2023.01) |
| *H04W 12/084* | (2021.01) |
| *H04W 88/16* | (2009.01) |
| *H04W 48/20* | (2009.01) |

(52) U.S. Cl.
CPC ......... *H04W 72/53* (2023.01); *H04W 12/084* (2021.01); *H04W 48/20* (2013.01); *H04W 88/16* (2013.01)

(58) Field of Classification Search
CPC ........................... H04W 4/24; H04W 4/50–80
See application file for complete search history.

(56) References Cited

U.S. PATENT DOCUMENTS

| | | | | |
|---|---|---|---|---|
| 2009/0180430 A1* | 7/2009 | Fadell | ................... | H04W 72/27 370/329 |
| 2013/0182693 A1* | 7/2013 | Sperling | ............... | H04W 12/50 370/338 |
| 2013/0318572 A1* | 11/2013 | Singh | ..................... | H04L 63/10 726/4 |

(Continued)

*Primary Examiner* — San Htun
(74) *Attorney, Agent, or Firm* — Wenderoth, Lind & Ponack, L.L.P.

(57) ABSTRACT

An apparatus, method, and computer-readable recording medium perform client access delegation for a network device in a wireless network. A network controller of a gateway device receives a super-user client device authorization from the network admin client device, connects the super-user client device to the gateway device, receives a second-party client device access authorization from the super-user client device, and connects the second-party client device to the gateway device. The network controller of the gateway device also allocates a portion of available network bandwidth to a second group of client devices, monitors bandwidth consumption by the second group of users, and limits the bandwidth consumption of the second group of users to the allocated portion of the available bandwidth.

20 Claims, 4 Drawing Sheets

(56) References Cited

U.S. PATENT DOCUMENTS

2015/0327060 A1* 11/2015 Gilson .................. H04W 76/11
                                                        726/7
2017/0078880 A1*  3/2017 Likar ................... H04W 8/005
2018/0351809 A1* 12/2018 Meredith ............ H04L 43/0882

* cited by examiner

MULTIPLE PARTY WI-FI ROUTER IN A WIRELESS NETWORK

TECHNICAL FIELD

The subject matter of the present disclosure relates generally to management and control of wireless devices in a wireless network.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). The wireless industry recognized these issues and developed standards for routing protocols such as a multi-access point (MAP) or mesh protocol, which allows wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device for the control and management of devices in the wireless network to improve the quality of experience (QoE) for users. Additionally, there have been advances in allocation, sharing, and monitoring user bandwidth access to wireless networks. These advances may permit gateway devices and its related access points to permit sharing of excess unused network bandwidth with second parties. The gateway devices may support a network administrator to create additional groups of users of the wireless network, to delegate user access authorization and support to a super-user as a member of the second group of users, a monitor and control bandwidth usage by members of the multiple groups of users to ensure an expected level of network throughput for each group of users.

Thus, it would be advantageous and an improvement over the relevant technology for providing multiple party access sharing of wireless networks to any number of wireless clients.

SUMMARY

An aspect of the present disclosure provides a gateway device for providing multiple party access sharing of wireless networks to any number of wireless clients. The wireless network is configured to communicatively interconnect the gateway device, one or more wireless extenders, and one or more client devices.

In this aspect of the present disclosure, the gateway device includes a network controller, a non-transitory memory storing a program, and a communication interface configured to establish communication connections with the one or more client devices and the one or more wireless extenders via the wireless network.

The network controller is configured to execute the program to receive a super-user client device authorization from the network admin client device, connect the super-user client device to the gateway device, receive a second-party client device access authorization from the super-user client device, and connect the second-party client device to the gateway device.

In an aspect of the present disclosure, the network controller allocates a portion of available network bandwidth to a second group of client devices, monitors bandwidth consumption by the second group of users, and limits the bandwidth consumption of the second group of client devices to the allocated portion of the available bandwidth.

In yet another aspect of the present disclosure, a first group of users is allocated a primary portion of the available bandwidth and the allocated portion of the available bandwidth corresponds to any remaining available bandwidth after providing the first group of users the primary portion of the available bandwidth.

In yet another aspect of the present disclosure, the second group of users also may consume any unused bandwidth of the primary portion of the available bandwidth until the unused bandwidth is needed to satisfy client devices of the first group of users.

In yet another aspect of the present disclosure, the second group of users provides payment to the first group of users to obtain the allocated portion of the available bandwidth.

In yet another aspect of the present disclosure, payment to obtain the allocated portion of the available bandwidth is provided for a periodic time period.

In yet another aspect of the present disclosure, payment to obtain the allocated portion of the available bandwidth is provided on a per use basis.

An aspect of the present disclosure provides a method for providing multiple party access sharing of wireless networks to any number of wireless clients. The wireless network is configured to communicatively interconnect a gateway device, one or more wireless extenders, and one or more client devices. The method includes receiving a super-user client device authorization from the network admin client device, connecting the super-user client device to the gateway device, receiving a second-party client device access authorization from the super-user client device, and connecting the second-party client device to the gateway device.

In another aspect of the present disclosure, the method further allocates a portion of available network bandwidth to a second group of client devices, monitors bandwidth consumption by the second group of users, and limits the bandwidth consumption of the second group of client devices to the allocated portion of the available bandwidth.

An aspect of the present disclosure provides a non-transitory computer-readable recording medium in a gateway device for providing multiple party access sharing of wireless networks to any number of wireless clients, the wireless network configured to communicatively interconnect the gateway device, one or more wireless extenders, and one or more client devices, and the non-transitory computer-readable recording medium storing one or more programs which, when executed by a network controller of the gateway device, performs steps of the methods described above.

BRIEF DESCRIPTION OF THE DRAWINGS

In the drawings, like reference numbers generally indicate identical, functionally similar, and/or structurally similar elements.

DETAILED DESCRIPTION

Figure 1:
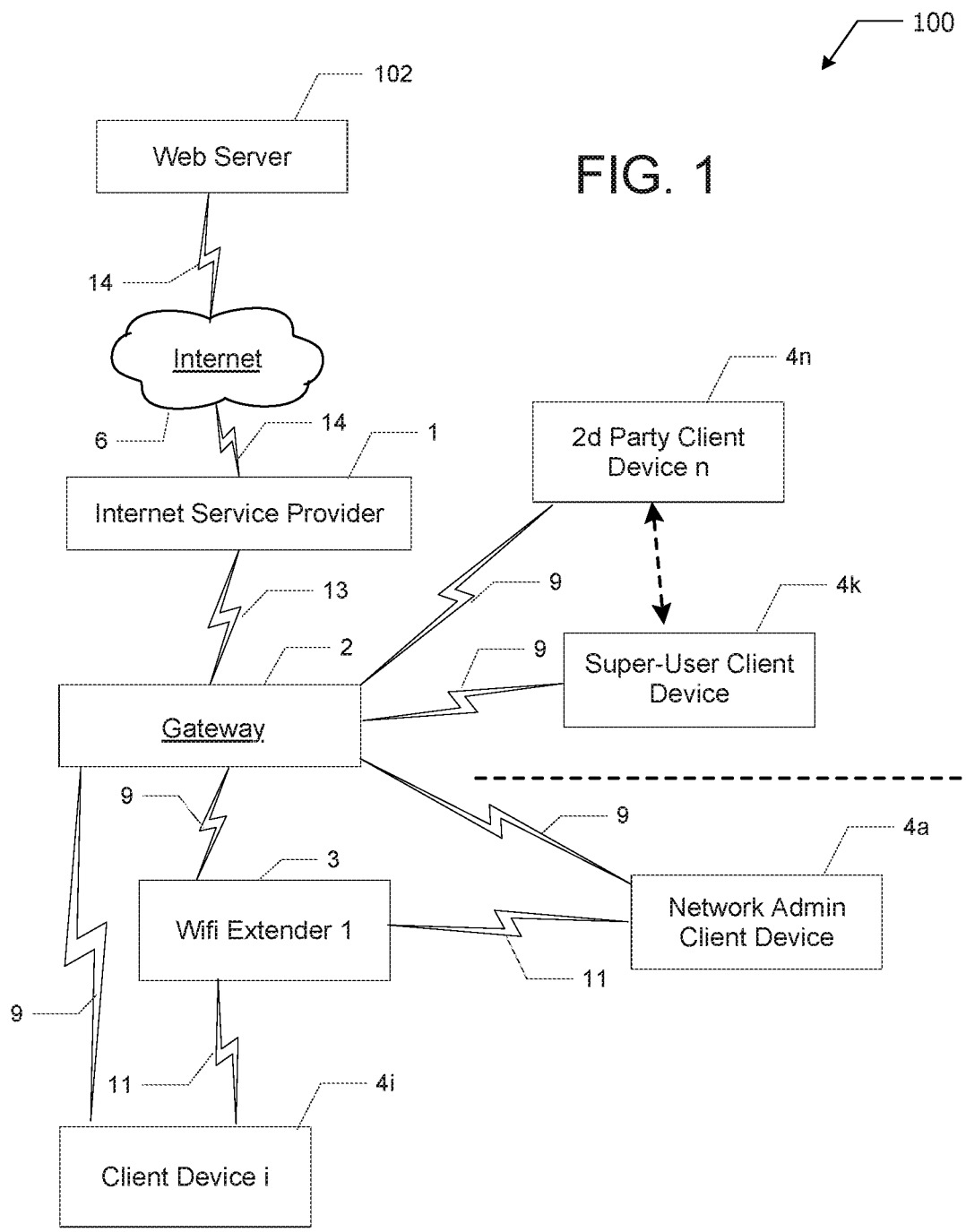
FIG. 1 is a schematic diagram of a system according to an embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The term "invention" or "present invention" refers to the invention being applied for via the patent application with the title "Multiple Party Wi-Fi Router in a Wireless Network." Invention may be used interchangeably with multi-party access point.

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

FIG. 1 is a schematic diagram of a system according to an embodiment of the present disclosure. As shown in FIG. 1, the main elements of the system 100 include a gateway device 2 connected to the Internet 6 via an Internet Service Provider (ISP) 1 and also connected to different wireless devices such as a wireless extender 3 and client devices 4a-n. The system 100 shown in FIG. 1 includes wireless devices (e.g., wireless extender 3 and client devices 4) that may be connected in one or more wireless networks (e.g., private, guest, iControl, backhaul network, or Internet of things (IoT) network) within the system. Additionally, there could be some overlap between wireless devices (e.g., wireless extender 3 and client devices 4) in the different networks. That is, one or more network devices could be located in more than one network. For example, the wireless extender 3 could be located both in a private network for providing content and information to a client device 4 and also included in a backhaul network or an iControl network.

Starting from the top of FIG. 1, the ISP 1 can be, for example, a web server 102, that provides content for client devices 4a-n connected to the gateway device 2 to access the Internet 6. The connection 14 between the Internet 6 and the ISP 1 and the connection 13 between the ISP 1 and the gateway device 2 can be implemented using, for example, a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line, a public switched data network (PSDN), a global Telex network, or a 2G, 3G, 4G or 5G network.

The connection 13 can further include as some portion thereof a broadband network connection, an optical network connection or other similar connection. For example, the connection 13 also can be implemented using a fixed wireless connection that operates in accordance with, but is not limited to, 3rd Generation Partnership Project (3GPP), Long Term Evolution (LTE) or 5G protocols.

The gateway device 2 can be, for example, a hardware electronic device that may be a combination modem and gateway device that combines the functions of a modem, an access point, and/or a router for providing content received from the content provider 1 to the network devices (e.g., wireless extender 3 and client devices 4a-n) in the system. It also is contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content and playing over-the-top (OTT)- or multiple system operator (MSO)-provided content.

The connection 9 between the gateway device 2, the wireless extender 3, and client devices 4a-n can be implemented using a wireless connection in accordance with any IEEE 802.11 Wi-Fi, Bluetooth, Bluetooth Low Energy (BLE) or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE, ZigBee, Z-Wave or IEEE 802.15.4 protocols. It also is contemplated by the present disclosure that the connection 9 can include connections to a media over coax (MoCA) network. One or more of the connections 9 also can be a wired Ethernet connection.

The wireless extender 3 can be, for example, hardware electronic devices such as access points used to extend the wireless network by receiving the signals transmitted by the gateway device 2 and rebroadcasting the signals to, for example, client devices 4*a-n* which may be out of range of the gateway device 2. The wireless extender 3 also can receive signals from the client devices 4 and rebroadcast the signals to the gateway device 2 or other client devices 4*a-n*.

The connections 11 between the wireless extender 3 and the client devices 4*a-n* are implemented through a wireless connection that operates in accordance with any IEEE 802.11 Wi-Fi, Bluetooth, Bluetooth Low Energy (BLE) or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE, ZigBee, Z-Wave or IEEE 802.15.4 protocols. Also, one or more of the connections 11 can be a wired Ethernet connection. While the example embodiment of FIG. 1 shows a single wireless extender 3, the system 100 may include multiple wireless extenders 3 to extend the coverage of the wireless network over a larger spatial area. All of the wireless extenders 3 operate in the same manner.

The client devices 4*a-n* can be, for example, hand-held computing devices, personal computers, electronic tablets, smart phones, smart speakers, IoT devices, iControl devices, portable music players with smart capabilities capable of connecting to the Internet, cellular networks or other devices via Wi-Fi and Bluetooth, or can be other wireless hand-held consumer electronic devices capable of executing and displaying content received through the gateway device 2. Additionally, the client devices 4 can be a TV, an IP/QAM STB or an SMD that is capable of decoding audio/video content and playing OTT- or MSO-provided content received through the gateway device 2.

The connection 9 between the gateway device 2 and the client devices 4*a-n* are implemented through a wireless connection that operates in accordance with, but is not limited to, any IEEE 802.11 protocols. Additionally, the connections 9 between the gateway device 2 and the client devices 4*a-n* also can be implemented, for example, through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network.

The connections 9 also can be implemented using a wireless connection in accordance with Bluetooth, Bluetooth Low Energy (BLE) or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 9 also can be a wired Ethernet connection.

Figure 2:
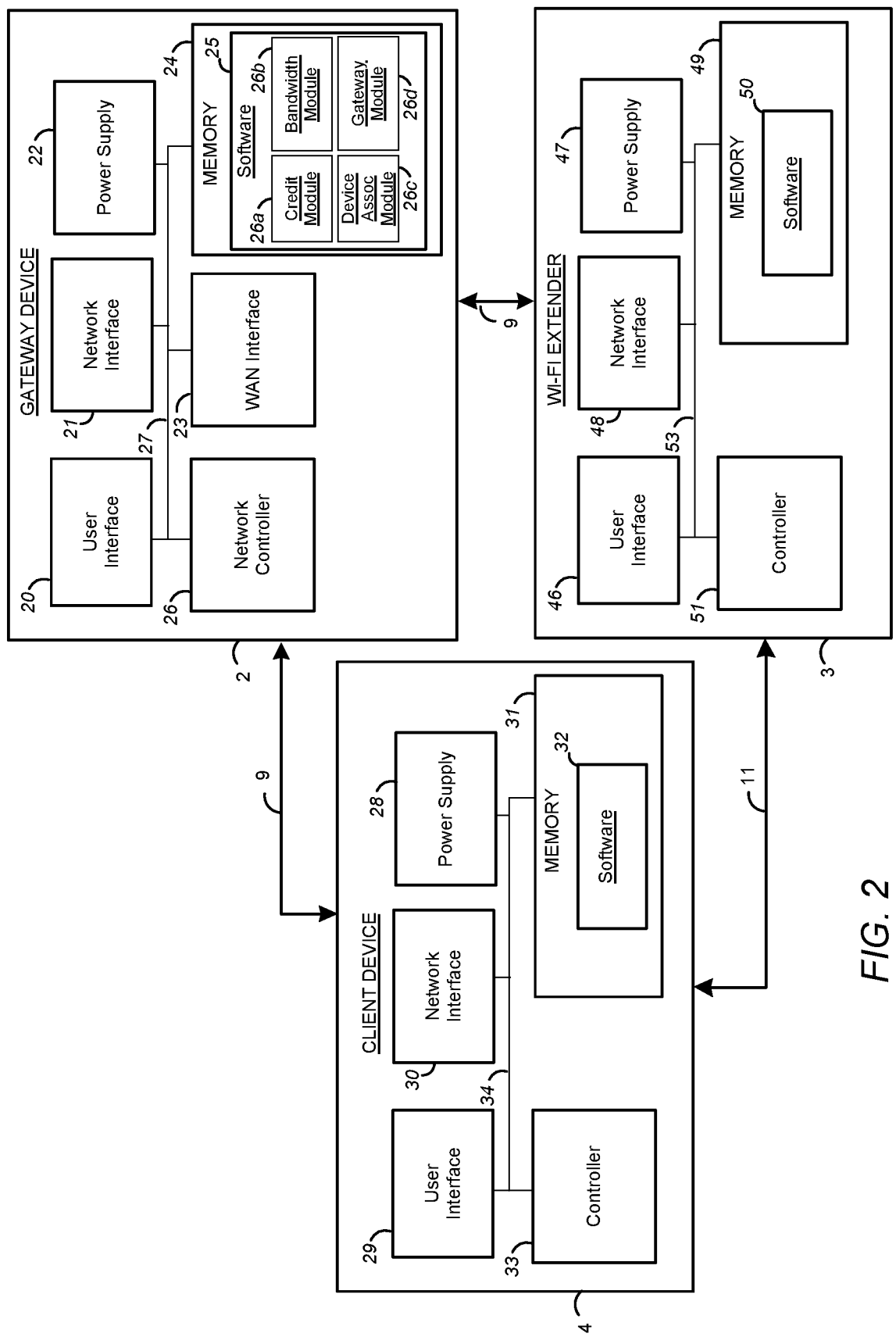
FIG. 2 is a more detailed schematic diagram of an exemplary gateway device, client device, and wireless extender implemented in the system of FIG. 1 according to an embodiment of the present disclosure.

A detailed description of the exemplary internal components of the gateway device 2, the wireless extender 3, and the client devices 4*a-n* shown in FIG. 1 will be provided in the discussion of FIG. 2. However, in general, it is contemplated by the present disclosure that the gateway device 2, the wireless extender 3, and the client devices 4*a-n* include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the gateway device 2, the wireless extender 3, and the client devices 4*a-n* may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extender 3, and the client devices 4*a-n* are further equipped with components to facilitate communication with other computing devices over the one or more network connections to local and wide area networks, wireless and wired networks, public and private networks, and any other communication network enabling communication in the system.

In the wireless network of FIG. 1, the client devices a-n may be divided into several different classes of users. These different classes of users comprise a network administrator client device 4*a*, a first party client device 4*i*, a second party super-user client device 4*k*, and a second party client device n-4*n*. The network administrator client device 4*a* and first party client device 4*i* are members of a first group of users and the second party super-user client device 4*k*, and the second party client device 4*n* are members of a second group of users.

In the example embodiment of FIG. 1, the first group of users is considered the primary user of network bandwidth from the gateway device 2 to communicate over the Internet 6 and consume content from the web server 102. Because the first group of users may not consume all of the available bandwidth from the gateway device 2, the second group of users may be allocated the unused portion of the available bandwidth. For example, in many apartment and condominium buildings, units may be able to access a wireless network maintained in a neighboring unit. If the wireless network is operating without an access password, any client device from the second group of users, or any other users, may access the wireless network and consume any available bandwidth. If the wireless network is password protected, users from the first group of users may share a password with the second group of users and all of these users may access the wireless network and consume all available bandwidth.

In the embodiment of FIG. 1, the network administrator client device 4*a* controls access to client devices that wish to connect to the wireless network. The network administrator client device 4*a* may grant access to the wireless network to the first party client device 4*i* and all other first party members of the first group of users. The network administrator client device 4*a* may identify client devices that may access or are prohibited from accessing the wireless network using a unique identifier, such as a MAC device address for each client device, so that the gateway device 2 may permit or prohibit client devices from connecting to the wireless network.

When a network administrator client device 4*a* decides that an unused portion of the available network bandwidth may be shared with a second group of users without affecting the observed performance of the wireless network for members of the first group of users, the network administrator client device 4*a* may allocate a portion of the unused bandwidth to the second group of users. The network administrator client device 4*a* may not know all of the members of the second group of users and may not wish to be responsible for granting access and providing connection information to this second group of users. Instead, the network administrator client device 4*a* may desire to delegate authority to control access to the second group of users to a second party super-user client device 4k. The network administrator client device 4a may specify a portion of the available bandwidth that will be controlled by the second party super-user client device 4k and grant this super user authority to provide access to other members of the second group of users to utilize the unused portion of the available bandwidth that has been allocated to the second group of users.

The gateway device 2 measures and controls the available bandwidth that may be consumed by a user at any given time by providing the user access to any requested bandwidth not currently in use and available to the group of users. When all of the available bandwidth for a group of users has been consumed, the gateway device 2 prohibits the members of this group of users from accessing bandwidth until a member of their group reduces usage of or stops consuming available bandwidth. The consumption of available bandwidth from one group of users is not impacted by the current use of available bandwidth of other groups of users as the allocation of available bandwidth by group may separate their uses completely. In other embodiments, a priority of access may be granted to each group of users such that each group may obtain at least the amount of bandwidth allocated to that particular group.

If for example, the current usage of the first group of users is significantly less than the total amount of bandwidth allocated to the first group of users because not many of these users are currently accessing the wireless network, the unused portion of this available bandwidth also may be utilized by the second group of users even if the second group of users is currently consuming all of their allocated bandwidth until such time as a member of the first group of users begins accessing the wireless network. When the user from the first group of users begins using the wireless network, the gateway device 2 ensures that that new first party client device 4i is provided all of the bandwidth it needs up to the total amount allocated to the first group of users. If the gateway device 2 must reclaim bandwidth from a second party client device 4n that has been using some of the unused bandwidth that was allocated for use by the first group of users, the gateway device 2 may reduce the bandwidth available to that second party client device 4n as needed.

The network administrator client device 4a may provide the unused portion of the available bandwidth that is shared with a second group of users as part of a fee-sharing arrangement between the network administrator client device 4a and the second party super-user client device 4k. The network administrator client device 4a typically pays the ISP 1 to gain access to the Internet 6 via the gateway device 2 and the ISP typically provides a stated amount of available bandwidth, or at least a minimum amount of available bandwidth. When the network administrator client device 4a shares the unused portion of the available bandwidth with the second group of users, the cost of this unused portion of the available bandwidth may be passed onto the members of the second group of users. The payment of these fees may be based upon a periodic time period or a per use measurement of usage. Payment of these fees may be provided under the control of the gateway device 2 that ensures payment has been made before access to the wireless network is granted. The payment of these fees also may be arranged between the network administrator and the super user in some other fashion as desired.

FIG. 2 is a more detailed schematic diagram of an exemplary gateway device 2, an exemplary wireless extender 3, and an exemplary client device 4 implemented in the system of FIG. 1 according to an embodiment of the present disclosure. Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9 between the gateway device 2, the wireless extender 3, and the client device 4 shown in FIG. 2 are meant to be exemplary connections and are not meant to indicate all possible connections between the gateway devices 2, wireless extenders 3, and client devices. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and with other devices via Wi-Fi and Bluetooth, or can be other wireless hand-held consumer electronic devices capable of executing and displaying the content received through the gateway device 2. Additionally, the client device 4 can be a TV, an IP/QAM STB or an SMD that is capable of decoding audio/video content and playing OTT- or MSO-provided content received through the gateway device 2.

As shown in FIG. 2, the client device 4 includes a power supply 28, user interface 29, network interface 30, memory 31, and controller 33. The power supply 28 provides power to the internal components of the client device 4 through the internal bus 34. The power supply 28 can be a self-contained power source such as a battery pack with an interface to be powered through an electrical charger connected to an outlet (e.g., either directly or by way of another device). The power supply 28 also can include a rechargeable battery that can be detached allowing for replacement such as nickel-cadmium (NiCd), nickel metal hydride (NiMH), lithium-ion (Li-ion), or a lithium polymer (Li-pol) batteries.

The user interface 29 includes, but is not limited to, push buttons, a keyboard, a keypad, a liquid crystal display (LCD), a cathode ray tube (CRT), a thin film transistor (TFT), a light-emitting diode (LED), and a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the gateway device 2 and the wireless extender 3 using the wireless protocols in accordance with connections 9 (e.g., as described with reference to FIG. 1).

The memory 31 includes a single memory or one or more memories or memory locations that include, but are not limited to, a random access memory (RAM), a dynamic random access memory (DRAM), a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software or algorithms for controlling the general function and operations of the client device 4 in accordance with the embodiments described in the present disclosure (e.g., providing multiple party access sharing of wireless networks to any number of wireless clients according to the embodiments of the present disclosure).

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms or software for controlling the operation and functions of the client device 4 in accordance with the embodiments described in the present disclosure. Communications between the components (e.g., 28-31 and 33) of the client device 4 may be established using an internal bus 34.

The wireless extender 3 can be, for example, a hardware electronic device such as an access point used to extend a wireless network by receiving the signals transmitted by the gateway device 2 and rebroadcasting the signals to client devices 4, which may be out of range of the gateway device 2. The wireless extender 3 also can receive signals from the client devices 4 and rebroadcast the signals to the gateway device 2, mobile device 5, or other client devices 4.

As shown in FIG. 2, the wireless extender 3 includes a user interface 46, power supply 47, network interface 48, memory 49, and controller 51. The user interface 46 can include, but is not limited to, push buttons, a keyboard, a keypad, an LCD, a TFT, an LED, and an HD or other similar display device including a display device having touch screen capabilities so as to allow interaction between a user and the wireless extender 3. The power supply 47 provides power to the internal components of the wireless extender 3 through the internal bus 53. The power supply 47 can include a self-contained power source such as a battery pack with an interface to be powered through an electrical charger connected to an outlet (e.g., either directly or by way of another device). The power supply 47 also can include a rechargeable battery that can be detached allowing for replacement such as NiCd, NiMH, Li-ion, or Li-pol batteries.

The network interface 48 can include various network cards, interfaces, and circuitry implemented in software and/or hardware to enable communications with the client device 4 and the gateway device 2 using the wireless protocols in accordance with connections 9 (e.g., as described with reference to FIG. 1). The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, a hard disk or any other various layers of memory hierarchy.

The memory 49 can be used to store any type of instructions, software or algorithm including software 50 associated with controlling the general functions and operations of the wireless extender 3 in accordance with the embodiments described in the present disclosure (e.g., providing multiple party access sharing of wireless networks to any number of wireless clients according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms or software for controlling the operations and functions of the wireless extender 3 in accordance with the embodiments described in the present disclosure. General communications between the components (e.g., 46-49 and 51) of the wireless extender 3 may be established using an internal bus 53.

The gateway device 2 can be, for example, a hardware electronic device that can combine the functions of a modem, an access point, and/or a router for providing content received from the content provider 1 to network devices (e.g., wireless extenders 3, client devices 4, and mobile devices 5 in the system. It is also contemplated by the present disclosure that the gateway device 2 can include the function of, but is not limited to, an IP/QAM STB or SMD that is capable of decoding audio/video content and playing OTT- or MSO-provided content.

As shown in FIG. 2, the gateway device 2 includes a user interface 20, network interface 21, power supply 22, WAN interface 23, memory 24, and network controller 26. The user interface 20 can include, but is not limited to, push buttons, a keyboard, a keypad, an LCD, a CRT, a TFT, an LED, and an HD or other similar display device including a display device having touch screen capabilities so as to allow interaction between a user and the gateway device 2. The network interface 21 may include various network cards, interfaces, and circuitry implemented in software and/or hardware to enable communications with the wireless extender 3 and client device 4 using the wireless protocols in accordance with connections 9 (e.g., as described with reference to FIG. 1). Additionally, the various network cards, interfaces, and circuitry of the network interface 21 enable communications with the mobile device using the wireless protocols in accordance connections 10 (e.g., as described with reference to FIG. 1).

The power supply 22 provides power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 also can include a rechargeable battery that can be detached allowing for replacement such as NiCd, NiMH, Li-ion or Li-pol batteries. The WAN interface 23 may include various network cards, interfaces, and circuitry implemented in software and/or hardware to enable communications between the gateway device 2 and the ISP 1 using the wireless protocols in accordance with connections 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, a hard disk or any other various layers of memory hierarchy. The memory 24 can be used to store any type of instructions, software or algorithm including software 25 for controlling the general functions and operations of the gateway device 2 and performing management functions related to the other devices (wireless extenders 3 and client devices 4) in the network in accordance with the embodiments described in the present disclosure (e.g., providing multiple party access sharing of wireless networks to any number of wireless clients according to the embodiments of the present disclosure).

Within the memory 24, the software 25 may specifically include various modules of instructions that, when executed by the network controller 26, perform various functions of the disclosed herein. These additional software modules comprise a credit module 26a, bandwidth module 26b, device access module 26c, and gateway module 26d. The credit module 26a may be utilized to collect payment from various users of the wireless network. The second group of users, for example, may submit payment to the credit module 26a to obtain access for a user or the entire group of users to their allocated portion of the available bandwidth.

The bandwidth module 26b monitors and enforces bandwidth limits upon users of the gateway device 2 to ensure the availability of bandwidth allocated to each group of users. The bandwidth module 26b establishes the priority of one group of users over another group of users to access any available bandwidth and establishes unused bandwidth-sharing rules. Embodiments can include monitoring and/or limiting bandwidth consumption from one or more connected clients.

The device access module 26c provides access to the wireless network to all users of the wireless network. The network administrator client device 4a uses the device access module 26c to provide user access to members of the first group of users in addition to providing a user access as a super-user of a second group of users with its allocated portion of the available bandwidth. The second party super-user device 4k uses the device access module 26c to provide access to users within the second group of users and makes any payment arrangements necessary with the credit module 26a.

The gateway module 26d performs all of the remaining functions of the gateway device 2 to configure and maintain the wireless network, its connections to client devices 4a-n, and wireless extender 3, and establish and maintain the connection to the ISP 1 and the Internet 6. Other functions such as firewalls, security threat monitoring and similar network functions also may be included within the gateway module 26d.

The network controller 26 controls the general operations of the gateway device 2 as well as performs management functions related to the other devices (wireless extenders 3 and client devices 4) in the network. The network controller can include, but is not limited to, a CPU, a hardware microprocessor, a hardware processor, a multi-core processor, a single core processor, a FPGA, a microcontroller, an ASIC, a DSP or other similar processing device capable of executing any type of instructions, algorithms or software for controlling the operation and functions of the gateway device 2 in accordance with the embodiments described in the present disclosure. Communications between the components (e.g., 20-22, 24, and 26) of the gateway device 2 may be established using the internal bus 27.

Figure 3:
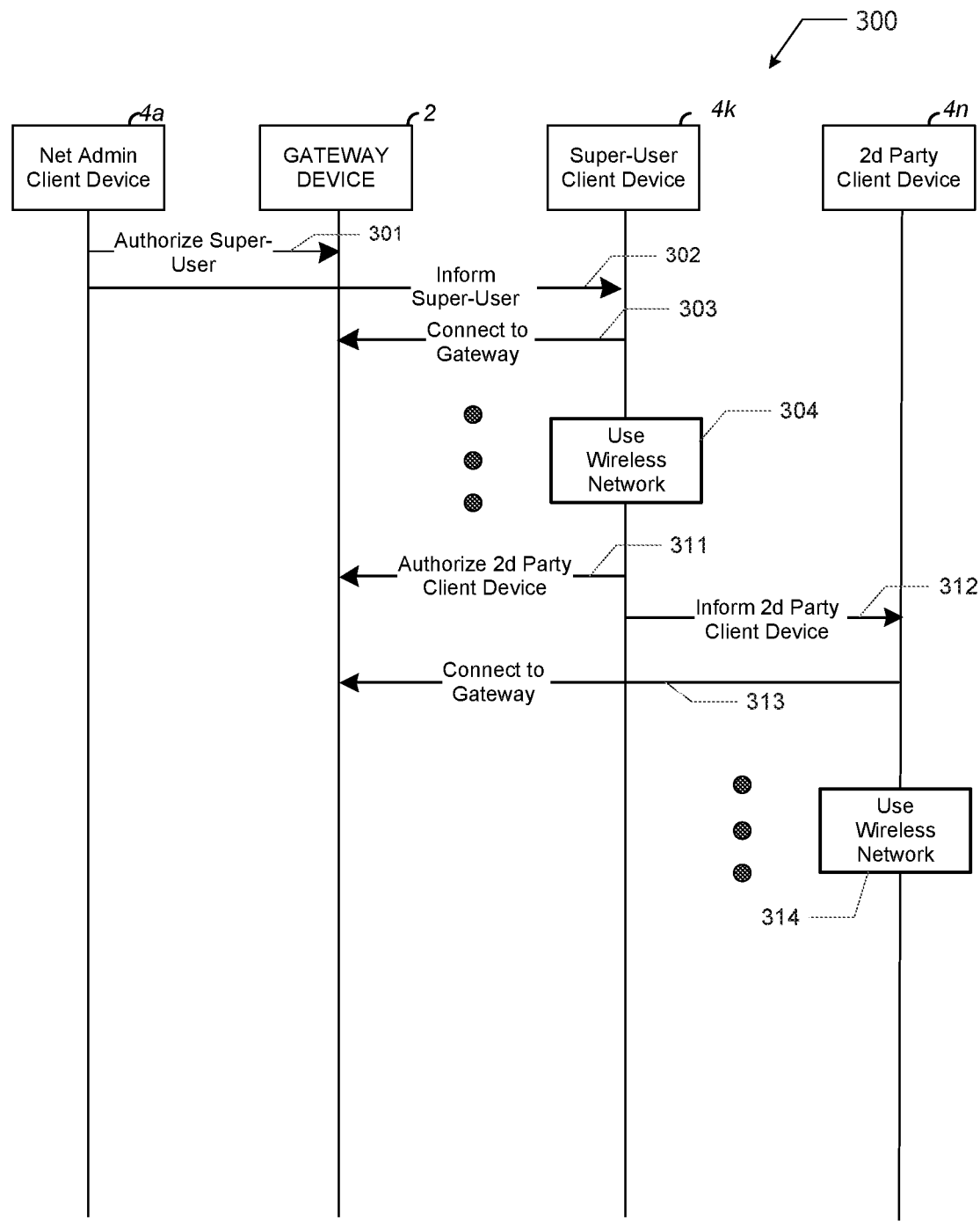
FIG. 3 illustrates a method and algorithm for providing multiple party access sharing of wireless networks to any number of wireless clients according to an embodiment of the present disclosure.

FIG. 3 illustrates a method and algorithm for providing multiple party access sharing of wireless networks to any number of wireless clients according to an embodiment of the present disclosure. In FIG. 3, it is assumed that the second party client device (e.g., client device 4n), second party super-user client device (client device 4k), network administrator client device (client device 4a), gateway device 2, and Wi-Fi extender 1 (e.g., wireless extender 3) include their respective software 25, 32, 50 stored in their respective memories 24, 31, 49 which, when executed by their respective controllers 26, 33, 51, perform the functions and operations in accordance with the embodiments described in the present disclosure (e.g., including for providing multiple party access sharing of wireless networks to any number of wireless clients according to the embodiments of the present disclosure).

Although FIG. 3 shows one gateway device 2, one second party client device (e.g., client device 4n), one second party super-user client device (client device 4k), and one network administrator client device (client device 4a), it is contemplated by the present disclosure that the method and algorithm can be applied to any number of gateway devices 2, client devices 4 of all types, and wireless extenders 3 for providing multiple party access sharing of wireless networks to any number of wireless clients in the system of FIG. 1.

In step 301, the process 300 begins when the network administrator client device 4a transmits an authorization request to the gateway device specifying that a second party super-user client device 4k is granted access to control access to the wireless network for a second group of users. The network administrator client device 4a informs the second party super-user client device 4k that access as a super-user has been delegated to the user in step 302. The second party super-user client device 4k accesses the gateway device 2 in step 303. The second party super-user client device 4k may use the wireless network as desired in step 304 for as long as access remains authorized.

At a later point in time, the second party super-user device 4k attempts to grant wireless network access to a second party client device 4n when in step 311 the second party super-user device 4k transmits an authorization required to the gateway device identifying the second party client device and the access rights to be provided. In step 312, the second party client device 4k sends the second party client device 4n a notification that access to the wireless device has been granted. The notification also may include instructions and related information to permit the second party client device 4n to connect to the wireless network. Using the information provided in the notification, the second party client device 4n connects to the gateway device 2 in step 313. The second party client device 4n may access the wireless network in step 314 until access is revoked by either the second party super-user device 4k or the network administrator client device 4a. The process 300 may repeat itself when the network administrator client device 4a creates another super-user and group of users to access the wireless network and may also repeat as the second party super-user device 4k grants access to additional members of the second group of users.

Figure 4:
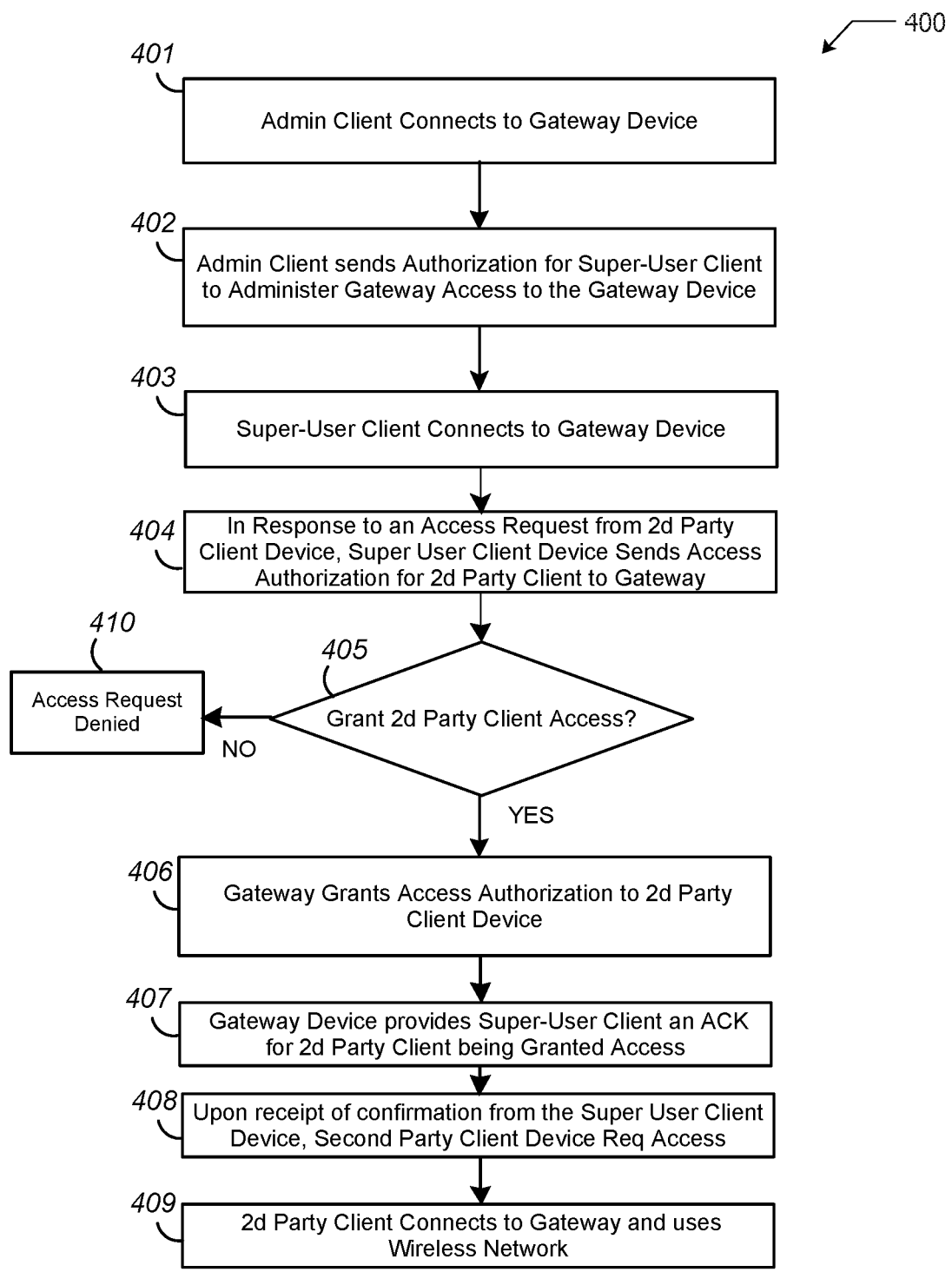
FIG. 4 illustrates a method and algorithm for providing multiple party access sharing of wireless networks to any number of wireless clients according to an embodiment of the present disclosure.

FIG. 4 illustrates a method and algorithm for providing multiple party access sharing of wireless networks to any number of wireless clients according to an embodiment of the present disclosure. The exemplary method and algorithm of FIG. 4 illustrate the action taken by the gateway device 2: a network administrator client device 4a grants access to the wireless network to a second party super-user client device 4k followed by the second party super-user client device 2k granting network access to a second party client device 4n. In FIG. 4, it is assumed that the new second party client device 4n, the gateway device 2, the network administrator client device 4a, and the second party super-user client device 4k include their respective software 25, 32, 50 stored in their respective memories 24, 31, 49 which, when executed by their respective controllers 26, 33, 51, perform the functions and operations in accordance with the embodiments described in the present disclosure (e.g., for providing multiple party access sharing of wireless networks to any number of wireless clients according to the embodiments of the present disclosure).

The process 400 begins when the network administrator client device 4a connects to the gateway device in step 401 and sends an authorization request to grant access to the wireless network to the second party super-user client device 4k since the super-user is permitted to administer access to the gateway device 2 to a second group of users in step 402.

The second party super-user client device 4k connects to the gateway device 2 in step 403 to begin access to the wireless network.

In response to an access request from the second party client device 4n, the super-user client device 4k sends access authorization for the second party client device 4n to the gateway device in step 404. In test step 405, the gateway device 2 determines whether or not the second party client device 4n is granted access to the wireless network. The gateway device 4 determines both whether the second party client device 4n is otherwise permitted to access the wireless network and whether the second party super-user device 4k is permitted to authorize the client device to access the wireless network. If the gateway device 2 determines that the second party client device 4n is not to be provided access to the wireless network in test step 405, access is denied in step 410 and the process 400 ends; otherwise, the gateway device 2 grants access to the second party client device 4n in step 406.

The gateway device 2 provides the second party super-user device 3k an acknowledgement that access to the wireless network has been granted to the second party client device 4n in response to the submitted request in step 407. After receipt of notification from the second party super-user client device 4k, the second party client device 4n transmits an access request to the gateway device 2 to connect to the wireless network. The gateway device grants access to the wireless network to the second party client device 4n in step 409 and the process ends.

Even though particular combinations of features are recited in the present application, these combinations are not intended to limit the disclosure. In fact, many of these features may be combined in ways not specifically recited in this application. In other words, any of the features mentioned in this application may be included in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A gateway device for client access delegation for a network device in a wireless network, the wireless network configured to communicatively interconnect the gateway device, a network admin client device, a super-user client device, and one or more second-party client devices, the gateway device comprising:
   a memory having instructions stored thereon, wherein the network admin client device is associated with a first group of users, and wherein the one or more second-party client devices and the super-user client device are associated with a second group of users; and
   a processor configured to execute the instructions on the memory to cause the gateway device to:
      receive a super-user client device authorization request from the network admin client device, wherein the super-user client device authorization request specifies that the super-user client device is granted access by the network admin client device to control access to the wireless network for the second group of users to an unused portion of available bandwidth, and wherein the unused portion of available bandwidth is bandwidth not used by the first group of users;
      connect the super-user client device to the gateway device;
      receive a second-party client device access authorization from the super-user client device, wherein the second-party client device access authorization identifies a second-party client device of the one or more second-party client devices and one or more access rights to be provided; and
      connect the second-party client device to the gateway device.

2. The gateway device according to claim 1, wherein the processor is further configured to cause the electronic apparatus to:
   allocate the unused portion of available network bandwidth to the second group of users;
   monitor bandwidth consumption by the second group of users; and
   limit the bandwidth consumption of the second group of users to the allocated portion of the available bandwidth.

3. The gateway device according to claim 2, wherein a first group of users is allocated a primary portion of the available bandwidth; and
   the allocated portion of the available bandwidth corresponds to any remaining available bandwidth after providing the first group of users the primary portion of the available bandwidth.

4. The gateway device according to claim 3, wherein the second group of users also may consume any unused bandwidth of the primary portion of the available bandwidth until the unused bandwidth is needed to satisfy client devices of the first group of users.

5. The gateway device according to claim 2, wherein the second group of users provides payment to the first group of users to obtain the allocated portion of the available bandwidth.

6. The gateway device according to claim 5, wherein payment to obtain the allocated portion of the available bandwidth is provided for a periodic time period.

7. The gateway device according to claim 5, wherein payment to obtain the allocated portion of the available bandwidth is provided on a per use basis.

8. A method by a gateway device for client access delegation for a network device in a wireless network, the wireless network configured to communicatively interconnect the gateway device, a network admin client device, a super-user client device, and one or more second-party client devices, the method comprising:
   receiving a super-user client device authorization request from the network admin client device, wherein the network admin client device is associated with a first group of users, wherein the one or more second-party client devices and the super-user client device are associated with a second group of users, wherein the super-user client device authorization request specifies that the super-user client device is granted access by the network admin client device to control access to the wireless network for the second group of users to an unused portion of available bandwidth, and wherein the unused portion of available bandwidth is bandwidth not used by the first group of users;
   connecting the super-user client device to the gateway device;
   receiving a second-party client device access authorization from the super-user client device, wherein the second-party client device access authorization identifies a second-party client device of the one or more second-party client devices and one or more access rights to be provided; and connecting the second-party client device to the gateway device.

9. The method according to claim 8, wherein the method further:
allocates the unused portion of available network bandwidth to the second group of users;
monitors bandwidth consumption by the second group of users; and
limits the bandwidth consumption of the second group of client devices to the allocated portion of the available bandwidth.

10. The method according to claim 9, wherein a first group of users is allocated a primary portion of the available bandwidth; and
the allocated portion of the available bandwidth corresponds to any remaining available bandwidth after providing the first group of users the primary portion of the available bandwidth.

11. The method according to claim 10, wherein the second group of users also may consume any unused bandwidth of the primary portion of the available bandwidth until the unused bandwidth is needed to satisfy client devices of the first group of users.

12. The method according to claim 9, wherein the second group of users provides payment to the first group of users to obtain the allocated portion of the available bandwidth.

13. The method according to claim 12, wherein payment to obtain the allocated portion of the available bandwidth is provided for a periodic time period.

14. The method according to claim 12, wherein payment to obtain the allocated portion of the available bandwidth is provided on a per use basis.

15. A non-transitory computer-readable recording medium in a gateway device for client access delegation for a network device in a wireless network, the wireless network configured to communicatively interconnect the gateway device, a network admin client device, a super-user client device, and one or more second-party client devices, the non-transitory computer-readable recording medium storing one or more programs which, when executed by a network controller of the gateway device, performs steps comprising:
receiving a super-user client device authorization request from the network admin client device, wherein the network admin client device is associated with a first group of users, wherein the one or more second-party client devices and the super-user client device are associated with a second group of users, wherein the super-user client device authorization request specifies that the super-user client device is granted access by the network admin client device to control access to the wireless network for the second group of users to an unused portion of available bandwidth, and wherein the unused portion of available bandwidth is bandwidth not used by the first group of users;
connecting the super-user client device to the gateway device;
receiving a second-party client device access authorization from the super-user client device, wherein the second-party client device access authorization identifies a second-party client device of the one or more second-party client devices and one or more access rights to be provided;
allocating the unused portion of available network bandwidth to the second group of users;
monitoring bandwidth consumption by the second group of users;
limiting the bandwidth consumption of the second group of users to the allocated portion of the available bandwidth; and
connecting the second-party client device to the gateway device.

16. The method according to claim 15, wherein a first group of users is allocated a primary portion of the available bandwidth; and
the allocated portion of the available bandwidth corresponds to any remaining available bandwidth after providing the first group of users the primary portion of the available bandwidth.

17. The method according to claim 16, wherein the second group of users also may consume any unused bandwidth of the primary portion of the available bandwidth until the unused bandwidth is needed to satisfy client devices of the first group of users.

18. The method according to claim 16, wherein the second group of users provides payment to the first group of users to obtain the allocated portion of the available bandwidth.

19. The method according to claim 18, wherein payment to obtain the allocated portion of the available bandwidth is provided for a periodic time period.

20. The method according to claim 18, wherein payment to obtain the allocated portion of the available bandwidth is provided on a per use basis.

* * * * *